(12) United States Patent
Mitsudomi

(10) Patent No.: US 7,177,035 B2
(45) Date of Patent: Feb. 13, 2007

(54) IMAGE FORMING APPARATUS WHICH ACCEPTS PRINTING INSTRUCTION PRIOR TO INITIALIZATION OF THE STORAGE SECTION

(75) Inventor: Toshiyuki Mitsudomi, Numazu (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 707 days.

(21) Appl. No.: 10/230,146

(22) Filed: Aug. 29, 2002

(65) Prior Publication Data

US 2004/0042028 A1    Mar. 4, 2004

(51) Int. Cl.
*B41B 27/00*    (2006.01)

(52) U.S. Cl. .................. 358/1.14; 358/1.15; 358/1.16; 710/8; 710/10; 710/17; 710/19

(58) Field of Classification Search ............. 358/1.14, 358/1.15, 444, 1.16; 710/10, 8, 17, 19
See application file for complete search history.

(56) References Cited

U.S. PATENT DOCUMENTS 5,408,589 A * 4/1995 Yamamoto .................. 358/1.1

2001/0024298 A1    9/2001 Yoshida

FOREIGN PATENT DOCUMENTS

JP    2001-245123    9/2001

* cited by examiner

*Primary Examiner*—King Y Poon
*Assistant Examiner*—Peter K Huntsinger
(74) *Attorney, Agent, or Firm*—Foley & Lardner LLP

(57) ABSTRACT

An image forming apparatus is disclosed which includes a power-on section which supplies power, a storage section which stores image data, a printing section which prints image data stored in the storage section, an instruction section which accept an instruction to print using the printing section, a processing section which initializes the storage section upon turn-on of the power-on section, a time measurement section which measures time required at least for the processing section to execute processing, a report section which reports that the apparatus is in a state in which the instruction section can accept the instruction to execute printing, a control section which controls, upon turn-on of the power-on section, report of the state in which the instruction section can accept the instruction to execute printing before completion of initialization of the storage section.

8 Claims, 5 Drawing Sheets

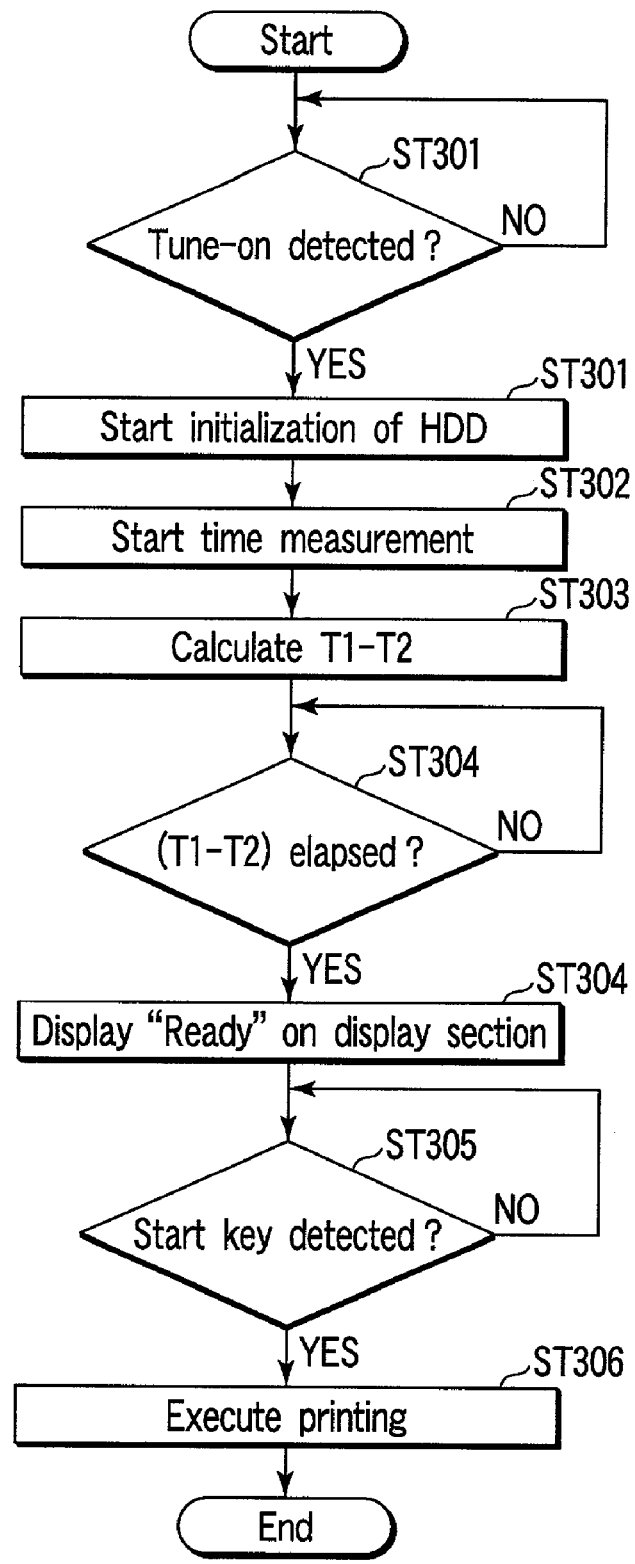
F I G. 6

IMAGE FORMING APPARATUS WHICH ACCEPTS PRINTING INSTRUCTION PRIOR TO INITIALIZATION OF THE STORAGE SECTION

BACKGROUND OF THE INVENTION

1. Field of the Invention

The present invention relates to an image forming apparatus provided with a storage device, such as a hard disk drive (HDD), which is initialized after turn-on.

2. Description of the Related Art

In image forming apparatuses, upon turn-on, heating of a fixing unit employed therein for fixing, for example, toner on a paper sheet is started, and initialization of an HDD that stores, for example, image data, is also started. When the fixing unit has reached a predetermined temperature, and the initialization of the HDD has finished, the image forming apparatus entails a copy-enabled state. At this time, a message, e.g., "Ready", indicating a copy-enabled state, is displayed on a display section in an operation panel, thereby informing a user.

In other words, upon turn-on, the user cannot 11 start copying until the fixing unit is heated to a predetermined temperature, and until the initialization of the HDD finishes.

For example, the time period required, before "Ready" is displayed, for increasing the temperature of fixing units may be shortened by a future improvement in fixing techniques. However, the time period required until the initialization of HDDs finishes is substantially constant between HDDs of the same type, and therefore it is difficult to shorten the time period required for the initialization process.

Further, there is a case where an error occurs in an image forming apparatus, and its user once turns off the apparatus and then turns it on again. Upon the second turn-on, the fixing unit is already warm, and therefore will soon reach a predetermined temperature, whereas the initialization of the HDD requires the same time period.

BRIEF SUMMARY OF THE INVENTION

It is an object of the invention to provide an image forming apparatus capable of reducing the time needed before a user can start copying, printing, etc. after turn-on of the apparatus, by informing the user, upon turn-on of the apparatus, that an instruction to execute printing is acceptable before the initialization of an HDD is completed.

According to an aspect of the invention, there is provided an image forming apparatus comprising: a power-on section which supplies power; a storage section which stores image data; a printing section which prints image data stored in the storage section; an instruction section which accept an instruction to print using the printing section; a processing section which initializes the storage section upon turn-on of the power-on section; a time measurement section which measures time required at least for the processing section to execute processing; a report section which reports that the apparatus is in a state in which the instruction section can accept the instruction to execute printing; a control section which controls, upon turn-on of the power-on section, report of the state in which the instruction section can accept the instruction to execute printing before completion of initialization of the storage section.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 6 is a flowchart illustrating a process for displaying "Ready" before the time period T1 elapses.

DETAILED DESCRIPTION OF THE INVENTION

An embodiment of the invention will be described with reference to the accompanying drawings. In this embodiment, the invention is applied to a complex machine.

Figure 1:
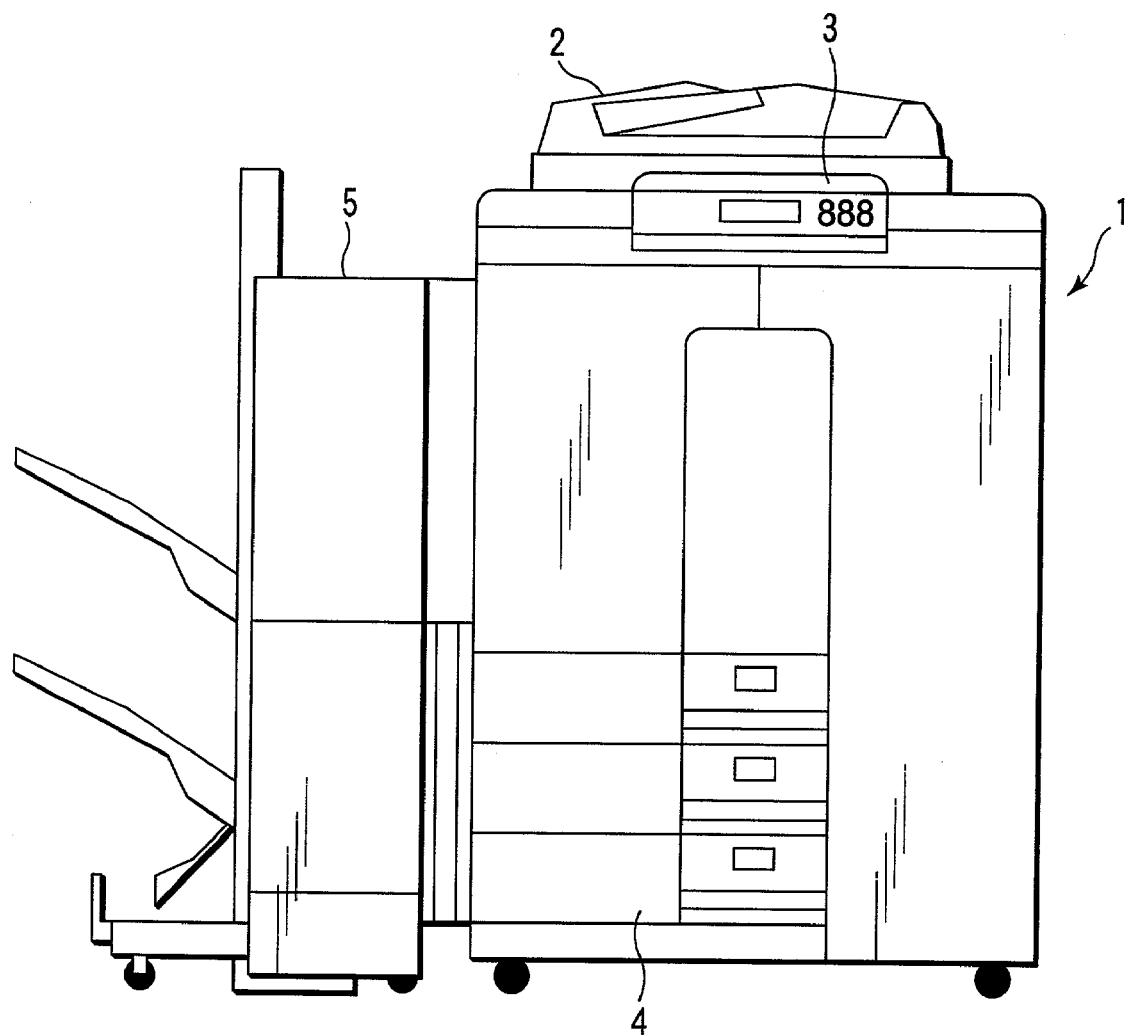
FIG. 1 is a schematic view illustrating an outward appearance of a copy machine according to an embodiment of the invention.

FIG. 1 is a schematic view of an outward appearance of a complex machine 1, illustrating an ADF 2 for feeding a document to a scanner section which reads an image of the document, operation/display panel 3, paper feed cassette 4 and paper discharge section 5, etc.

Figure 2:
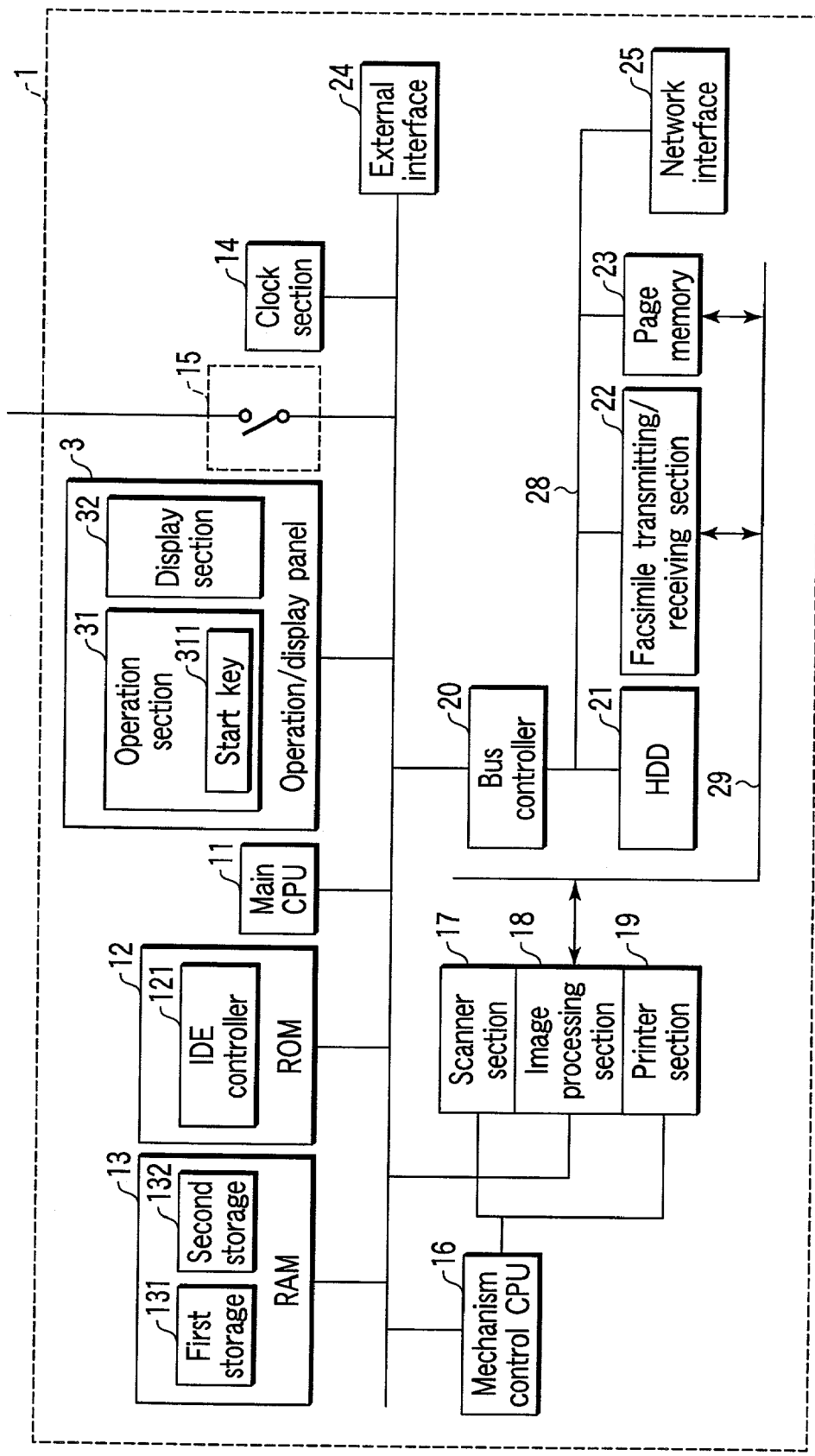
FIG. 2 is a block diagram illustrating the essential configuration of an image forming apparatus.

FIG. 2 is a block diagram illustrating the essential configuration of the complex machine 1. The complex machine 1 mainly comprises a main CPU 11, ROM 12, RAM 13, operation/display panel 3, clock section 14, power switch 15, mechanism control CPU 16, scanner section 17, image processing section 18, printer section 19, bus controller 20, HDD 21, facsimile transmitting/receiving section 22, page memory 23, external interface 24, network interface 25, etc.

The main CPU 11, ROM 12, RAM 13, operation/display panel 3, clock section 14, mechanism control CPU 16, image processing section 18, bus controller 20 and external interface 24 are connected to each other via a bus line 26. The mechanism control CPU 16, scanner section 17 and printer section 19 are connected to each other via a bus line 27. The bus controller 20, HDD 21, facsimile transmitting/receiving section 22, page memory 23 and network interface 25 are connected to each other via a bus line 28. The image processing section 18, facsimile transmitting/receiving section 22 and page memory 23 are connected to each other via a bus line 29.

The image processing section 18, printer section 19, facsimile transmitting/receiving section 22 and page memory 23 are designed to transmit/receive image data via the bus line 29. Further, the HDD 21, page memory 23, facsimile transmitting/receiving section 22 and network interface are designed to transmit/receive image data via the bus line 28.

The main CPU 11 executes control processing for controlling each section on the basis of the control program stored in the ROM 12, thereby realizing the operation of the complex machine 1.

The ROM 12 stores, for example, the control program for the main CPU 11. The ROM 12 stores an IDE controller 121 and executes, upon turn-on, an initialization process, such as partition of the HDD 21, under the control of the main CPU 11.

The RAM 13 is a nonvolatile memory and has various data areas and work areas necessary for the main CPU 11 to execute various processes. Further, the RAM 13 has an area assigned to a first storage 131 for storing the time period T1 required after turn-on until initialization of the HDD 21 finishes, and an area assigned to a second storage 132 for storing, when the scanner section 17 reads an image, the time period T2 required after the start of copying until the HDD 21 is first accessed, to store image data.

The clock section 14 measures predetermined time periods such as the time periods T1 and T2.

The power switch 15 supplies power or stops the supply of power to the complex machine 1 in accordance with an operation by a user.

The operation/display panel 3 includes an operation section 31 that is provided with a start key 311 used by the user to input various instructions, including an instruction to start copying, to the main CPU 11, and also includes a display section 32, formed of, for example, a liquid crystal display, for displaying, under the control of the main CPU 11, various types of information to be informed of to the user. The display section 32 displays "Ready" when the machine is in a printing-enabled state. This state will be described later in detail.

The machine control CPU 16 controls the mechanical operations of the scanner section 17 and printer section 19.

The scanner section 17 reads, using a scanner, an image of a document fed from, for example, the ADF 3, and supplies a signal indicative of the read image to the image processing section 18.

The printer section 19 is provided with various units including a fixing unit, and copies a document on a paper sheet, fed through a paper feed path (not shown), on the basis of the image data supplied.

The image processing section 18 executes predetermined image processing on an image signal indicative of a document read by the scanner section 17. The image data obtained by the image processing is supplied to the HDD 21 via the page memory 23.

The bus controller 20 controls various signal destinations under the control of the main CPU 11.

The facsimile transmission/receiving section 22 receives or transmits an Internet facsimile via the network interface 25.

The page memory 23 executes rotation, compression/expansion, resolution conversion, etc. of image data in units of pages.

The scanner section 17, printer section 19 and facsimile transmission/receiving section 22 can operate individually.

Referring now to FIGS. 3–7, a description will be given of the operation of the complex machine 1 constructed as above, executed, after turn-on of the machine, when the complex machine 1 is in a state in which it can accept an input through the start key 311, i.e., in which "Ready" is displayed on the display section.

Figure 3:
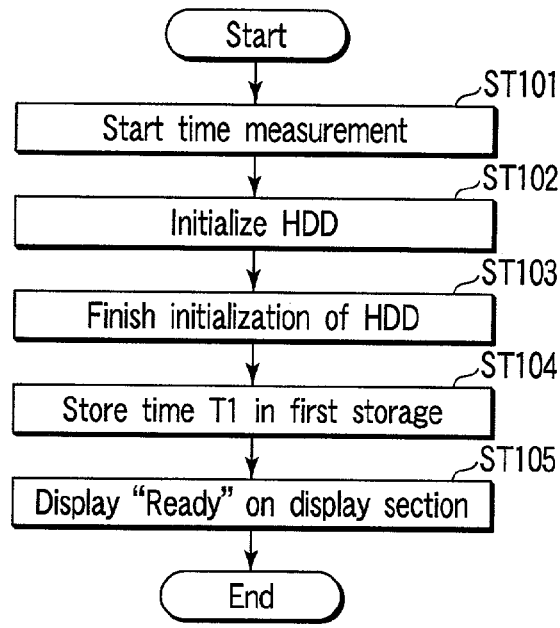
FIG. 3 is a flowchart illustrating a process for storing a time period T1 required for initialization.

FIG. 3 is a flowchart illustrating a process for storing the time period T1 required for initialization executed by the main CPU 11.

When the complex machine 1 is turned on, the main CPU 11 starts time measurement at a step ST101. At a step ST102, the IDE controller 121 is controlled by the main CPU 11 and starts the initialization of the HDD 21. At a step ST103, the main CPU 11 determines whether or not the initialization of the HDD 21 has been finished. If initialization has been finished, the main CPU 11 stores, at a step ST104, the time required for initialization as the time period T1 in the first storage 131. At a step ST105, the main CPU 11 displays "Ready" on the display section 32.

Figure 4:
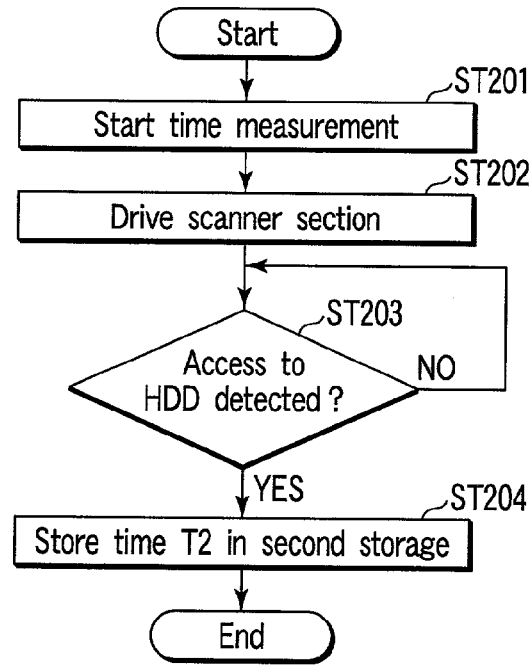
FIG. 4 is a flowchart illustrating a process for storing a time period T2 required for access.

FIG. 4 is a flowchart illustrating a process executed by the main CPU 11 when the input of the start key 311 has been detected, after "Ready" is displayed on the display section 32.

Upon detection of the input of the start key 311, the main CPU 11 starts time measurement at a step ST201. At the next step ST202, the main CPU 11 drives the scanner section 17 to read an image of a to-be-copied document. At a step ST203, the main CPU 11 determines whether or not the HDD 21 is accessed to store read image data. If it is determined that the HDD 21 is accessed, the main CPU 11 stores, at a step ST204, the time required for access as the time period T2 in the second storage 132.

Figure 5:
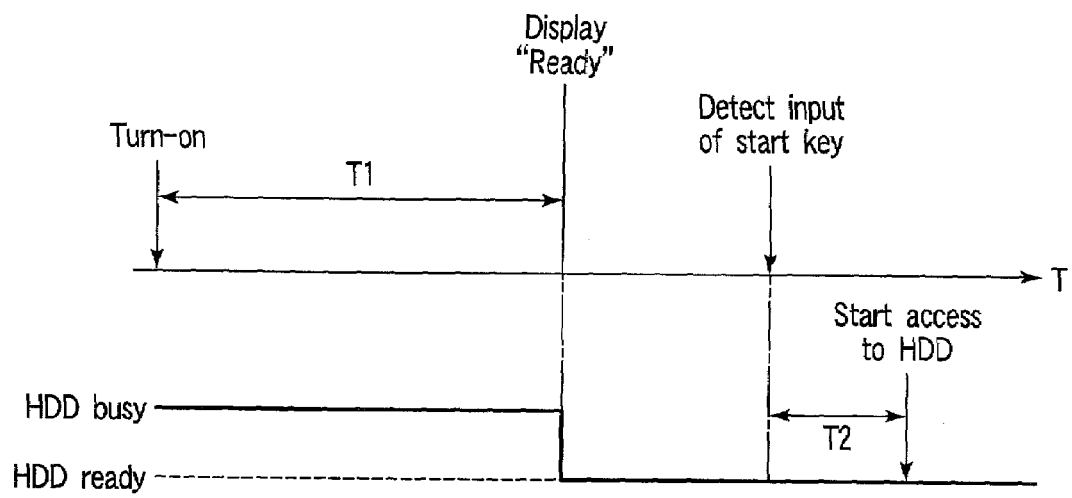
FIG. 5 is a view illustrating the initialization time period T1 and access time period T2 required for an HDD.

FIG. 5 is a view illustrating the initialization time period T1 ranging from the tune-on of the complex machine 1 to the completion of the initialization of the HDD 21, the time point at which "Ready" is displayed on the display section 32 after the time period T1 elapses, and the time period T2 required until the input of the start key 311 is detected and the HDD 21 is accessed to store image data.

Thus, the time period T1 stored in the first storage 131, and the time period T2 stored in the second storage 132 are stored in the respective storages each time the complex machine 1 is turned on. Alternatively, the time periods T1 and T2 may be prestored.

FIG. 6 is a flowchart illustrating processing executed by the main CPU 11 upon turn-on of the complex machine 1 if the time periods T1 and T2 are stored in the first and second storages 131 and 132, respectively.

At a step ST301, the main CPU 11 determines whether or not power-on has been detected. Upon detecting power-on, the main CPU 11 starts time measurement at a step ST302. At a step ST303, the main CPU 11 starts initialization of the HDD 21. At a step ST304, the main CPU 11 reads the time periods stored in the respective storages, thereby subtracting the time period T2 from the time period T1. At a step ST305, the main CPU 11 determines whether or not the measured time period exceeds the time period obtained by subtracting the time period T2 from the time period T1. If it is determined that the measured time period exceeds the time period obtained by subtraction, the main CPU 11 displays "Ready" on the display section 32 at a step ST306. Thereafter, at a step ST307, the main CPU 11 executes copying if it detects the input of the start key 311.

Figure 7:
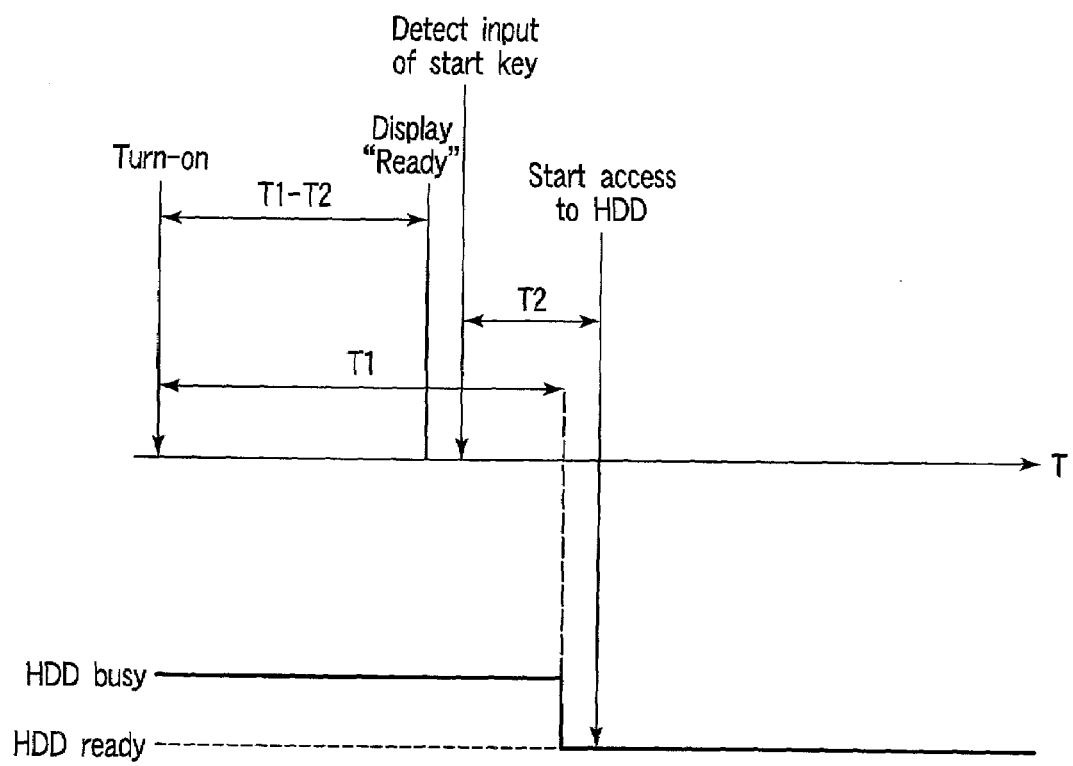
FIG. 7 is a flowchart illustrating a time point at which "Ready" is displayed before the time period T1 elapses.

In other words, as shown in FIG. 7, the complex machine 1 displays "Ready" on the display section 32 and accepts the input of the start key 311 the time period T2 before the elapse of the time period T1 that is required to complete the initialization of the HDD 21. Thus, in the complex machine 1, when the input of the start key 311 is detected, the initialization of the HDD 21 is finished, then the scanner section 17 is driven to start the reading of the image data, and the HDD 21 is accessed to store the read image data.

As described above, since in the complex machine 1, the input of the start key 311 is accepted before the initialization of the HDD 21 is completed after the turn-on of the machine 1, the time period required after the turn-on of the machine 1 until the user can start a copying operation can be shortened.

Thus, when the maximum time is required to initialize the HDD 21 where the complex machine 1 is ready to start copying since, for example, the fixing unit is heated to a predetermined temperature, the user can shorten the time period required for copying by the time period that starts, before the elapse of the time period T2, when they push the start key 311 after "Ready" is displayed on the display section 32.

Further, if the time periods T and T2 used to display "Ready" on the display section 32 before the completion of the initialization of the HDD 21 are set to the values that are obtained by measurement executed in the previous occasion of machine activation, the time to be shortened can be set more accurately.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image forming apparatus comprising:
   a power-on section which supplies power;
   a hard disk which stores image data;
   a printing section which prints image data stored in the hard disk;
   an instruction section which accepts an instruction to print using the printing section;
   a processing section which initializes the hard disk upon turn-on of the power-on section;
   a time measurement section which measures time required at least for the processing section to execute processing;
   a display section which displays that the apparatus is in a state in which the instruction section can accept the instruction to execute printing;
   a control section which controls, upon turn-on of the power-on section, report of the state in which the instruction section can accept the instruction to execute printing before completion of initialization of the hard disk;
   a first storage which stores a time period required for the processing section to finish the initialization;
   a reading section which reads image data from a document;
   a second storage which stores a time period required for the reading section to read image data and to access the hard disk in order to store the read image data,
   wherein the control section executes displaying at the end of a time period stored in the second storage subtracted from the time period stored in the first storage, and
   wherein the time period is stored in each of the first and second storages in advance of a time when the respective time period will occur.

2. An image forming apparatus according to claim 1, wherein the time period stored in each of the first and second storages corresponds to a time period stored in a previous turn-on of the apparatus.

3. An image forming apparatus comprising:
   power-on means for supplying power;
   a hard disk for storing image data;
   printing means for printing image data stored in the hard disk;
   instruction means for accepting an instruction to print using the printing means;
   processing means for initializing the hard disk upon turn-on of the power-on means;
   time measurement means for measuring time required at least for the processing means to execute processing;
   display means for displaying that the apparatus is in a state in which the instruction means can accept the instruction to execute printing;
   control means for controlling, upon turn-on of the power-on means, report of the state in which the instruction means can accept the instruction to execute printing before completion of initialization of the hard disk;
   first storage means for storing a time period required for the processing section to finish the initialization;
   reading means for reading image data from a document;
   second storage means for storing a time period required for the reading section to read image data and to access the hard disk in order to store the read image data,
   wherein the control means controls the display means to display a message at the end of a time period stored in the second storage means subtracted from the time period stored in the first storage means, and
   wherein the time period is stored in each of the first and second storages in advance of a time when the respective time period will occur.

4. An image forming apparatus according to claim 3, wherein the message indicates that the apparatus is in a Ready state.

5. A method according to claim 3, wherein the time period stored in each of the first and second storages corresponds to a time period stored in a previous turn-on of the apparatus.

6. A method of operating an image forming apparatus, comprising:
   detecting turn-on of the apparatus;
   executing, upon the turn-on, an initialization process on a hard disk which stores image data;
   measuring a time period required at least for the initialization process;
   displaying that the apparatus is in a state in which an instruction to execute printing is acceptable, before completion of the initialization process on the hard disk;
   accepting an instruction to print;
   storing a time period required to finish the initialization process;
   reading image data from a document;
   storing a time period required to read image data and to access the hard disk in order to store the read image data; and
   displaying a message that the apparatus is in a state in which an instruction to execute printing is acceptable,
   wherein the apparatus executes displaying at the end of a time period stored in the second step subtracted from the time period stored in the first storing step, and
   wherein the time period stored in each of the first and second storing steps corresponds to a time period stored in a previous turn-on of the apparatus.

7. A method according to claim 6, wherein the time period is stored in each of the first and second storing steps in advance of a time when the respective time period will occur.

8. A method according to claim 6, wherein the message indicates that the apparatus is in a Ready state.

* * * * *

UNITED STATES PATENT AND TRADEMARK OFFICE
CERTIFICATE OF CORRECTION

PATENT NO. : 7,177,035 B2
APPLICATION NO. : 10/230146
DATED : February 13, 2007
INVENTOR(S) : Mitsudomi et al.

It is certified that error appears in the above-identified patent and that said Letters Patent is hereby corrected as shown below:

On the Title page,

[*] Notice: Subject to any disclaimer, the term of this patent is extended or adjusted under 35 USC 154(b) by (707) days Delete the phrase "by 707 days" and insert -- by 762 days --

Signed and Sealed this

Twenty-fifth Day of December, 2007

JON W. DUDAS
*Director of the United States Patent and Trademark Office*